United States Patent
Frank et al.

(10) Patent No.: US 8,626,862 B2
(45) Date of Patent: Jan. 7, 2014

(54) IDENTIFYING PEOPLE AND AVAILABLE COMMUNICATION MODES

(75) Inventors: Randall Frank, Weston, MA (US); Scott J. Prusinoski, Brighton, MA (US); Vijay Vujjini, Malden, MA (US)

(73) Assignee: FMR LLC, Boston, MA (US)

( * ) Notice: Subject to any disclaimer, the term of this patent is extended or adjusted under 35 U.S.C. 154(b) by 1046 days.

(21) Appl. No.: 10/979,281

(22) Filed: Nov. 2, 2004

(65) Prior Publication Data

US 2005/0125498 A1    Jun. 9, 2005

Related U.S. Application Data

(63) Continuation of application No. 10/952,034, filed on Sep. 28, 2004, which is a continuation of application No. 10/728,374, filed on Dec. 4, 2003.

(51) Int. Cl.
*G06F 15/16* (2006.01)

(52) U.S. Cl.
USPC ........... 709/207; 709/204; 709/205; 709/206; 709/217; 715/201; 715/700; 715/751; 715/752; 715/753; 715/758; 715/780; 379/93.23

(58) Field of Classification Search
USPC .......... 709/228, 204–207, 217; 715/201, 700, 715/751–753, 758, 780; 379/93.23
See application file for complete search history.

(56) References Cited

U.S. PATENT DOCUMENTS

| | | | |
|---|---|---|---|
| 5,793,365 A * | 8/1998 | Tang et al. | 715/758 |
| 6,049,796 A * | 4/2000 | Siitonen et al. | 707/711 |
| 6,360,252 B1 * | 3/2002 | Rudy et al. | 709/206 |
| 6,807,562 B1 * | 10/2004 | Pennock et al. | 709/204 |
| 7,007,239 B1 * | 2/2006 | Hawkins et al. | 715/780 |
| 7,050,553 B2 * | 5/2006 | Chang et al. | 379/93.15 |
| 7,162,256 B2 * | 1/2007 | Seligmann et al. | 455/456.6 |
| 7,218,919 B2 * | 5/2007 | Vaananen | 455/412.1 |
| 7,240,093 B1 * | 7/2007 | Danieli et al. | 709/205 |
| 7,243,078 B1 * | 7/2007 | Lewis-Hawkins | 705/7.29 |
| 7,275,215 B2 * | 9/2007 | Werndorfer et al. | 715/752 |
| 7,334,021 B1 * | 2/2008 | Fletcher | 709/206 |
| 7,433,921 B2 * | 10/2008 | Ludwig et al. | 709/204 |
| 7,653,879 B1 * | 1/2010 | Sareen et al. | 715/752 |

(Continued)

OTHER PUBLICATIONS

Drew Robb, "Getting Messaging Together", www.computerworld.com, (Jan. 29, 2001) (6 pages).

(Continued)

*Primary Examiner* — Alina N Boutah
(74) *Attorney, Agent, or Firm* — Fish & Richardson P.C.

(57) ABSTRACT

A system that includes a computer device and a user interface. The user interface is configured to enable a user to interact with a person using one of at least two of voice conversation, voice-video conversation, graphic text-based conversation, fax, and electronic mail. The interactions can include the following. Creating a rule to cause the computer device to automatically perform an action based on a request to converse with the user. Viewing an automatically generated listing of a set of persons, the listing comprising a name, presence information, and communication modes available for the user to communicate with the person from the set of persons. Selecting the person from the set of persons. Selecting a communication mode from the communication modes available to communicate with the person, and retrieving information about a person using an identifying characteristic of the person, where the identifying characteristic is selected by the user from a display. Communicating with the person.

31 Claims, 10 Drawing Sheets

(56) References Cited

U.S. PATENT DOCUMENTS

| | | | |
|---|---|---|---|
| RE42,476 E * | 6/2011 | Vaananen | 455/412.1 |
| 2002/0002069 A1 * | 1/2002 | Keronen et al. | 463/1 |
| 2002/0032567 A1 * | 3/2002 | Lindholm et al. | 704/246 |
| 2002/0056000 A1 | 5/2002 | Albert Coussement | |
| 2002/0178270 A1 | 11/2002 | Riordan | |
| 2003/0233129 A1 * | 12/2003 | Matos | 607/5 |
| 2004/0014456 A1 * | 1/2004 | Vnnen | 455/413 |
| 2004/0024822 A1 * | 2/2004 | Werndorfer et al. | 709/206 |
| 2004/0051726 A1 * | 3/2004 | Martyn | 345/700 |
| 2004/0107255 A1 * | 6/2004 | Ludwig et al. | 709/204 |
| 2004/0199582 A1 * | 10/2004 | Kucharewski et al. | 709/204 |
| 2004/0203610 A1 * | 10/2004 | Deeds | 455/412.1 |
| 2005/0050150 A1 * | 3/2005 | Dinkin | 709/207 |
| 2005/0108207 A1 * | 5/2005 | Thuerk | 707/3 |
| 2005/0111638 A1 * | 5/2005 | Chang et al. | 379/93.15 |
| 2005/0125496 A1 * | 6/2005 | Thuerk | 709/204 |
| 2005/0198321 A1 * | 9/2005 | Blohm | 709/228 |
| 2007/0198944 A1 * | 8/2007 | Viswanathan et al. | 715/778 |
| 2011/0202867 A1 * | 8/2011 | Viswanathan et al. | 715/781 |

OTHER PUBLICATIONS

Web page titled, "MSN® Messenger for Windows®; MSN Messenger lets you see when your friends are online and exchange instant messages with them", http://messenger.msn.com, (Printed from the Internet on Mar. 28, 2003) (2 pages).

Web page titled, "MSN® Messenger for Windows®; MSN Messenger's great features are easy to use and just one click away", http://messenger.msn.com, (Printed from the Internet on Mar. 28, 2003) (2 pages).

Web page titled, "MSN® Messenger for Windows®; Stay in touch with Microsoft® .NET Alerts!", http://messenger.msn.com, (Printed from the Internet on Mar. 28, 2003) (2 pages).

Alcatel Technology Brief, "Extending the PC environment with more than a soft phone" (3 pages).

U.S. Appl. No. 10/728,374, Reply Brief, filed Aug. 24, 2009.

U.S. Appl. No. 10/728,374, Examiner's Answer mailed Jun. 24, 2009, in Response to Appeal Brief filed Mar. 16, 2009 appealing from the Office Action mailed Oct. 31, 2008.

U.S. Appl. No. 10/728,374, Appeal Brief filed Mar. 16, 2009.

U.S. Appl. No. 10/728,374, Office Action mailed Oct. 31, 2008.

U.S. Appl. No. 10/728,374, Response to Notification of Non-Compliant Appeal Brief, filed Jul. 29, 2008.

U.S. Appl. No. 10/728,374, Appeal Brief, filed Jun. 17, 2008.

U.S. Appl. No. 10/728,374, Advisory Action mailed Feb. 4, 2008.

U.S. Appl. No. 10/728,374, Reply to Office Action mailed Nov. 16, 2007, filed Jan. 16, 2008.

U.S. Appl. No. 10/728,374, Office Action mailed Nov. 16, 2007.

U.S. Appl. No. 10/728,374, Reply to Office Action mailed Mar. 2, 2007, filed Sep. 4, 2007.

U.S. Appl. No. 10/728,374, Office Action mailed Mar. 2, 2007.

U.S. Appl. No. 10/952,034, Office Action mailed Jul. 22, 2010.

U.S. Appl. No. 10/952,034, Reply to Office Action mailed Jan. 6, 2010, filed May 5, 2010.

U.S. Appl. No. 10/952,034, Office Action mailed Jan. 6, 2010.

U.S. Appl. No. 10/952,034, Reply to Office Action mailed Mar. 6, 2009, filed Aug. 24, 2009.

U.S. Appl. No. 10/952,034, Office Action mailed Mar. 6, 2009.

U.S. Appl. No. 10/952,034, Supplemental Appeal Brief, filed Oct. 17, 2008.

U.S. Appl. No. 10/952,034, Appeal Brief filed Sep. 16, 2008.

U.S. Appl. No. 10/952,034, Advisory Action mailed Feb. 4, 2008.

U.S. Appl. No. 10/952,034, Reply to Office Action mailed Nov. 16, 2007, Reply filed Jan. 16, 2007.

U.S. Appl. No. 10/952,034, Office Action mailed Nov. 16, 2007.

U.S. Appl. No. 10/952,034, Reply to Office Action mailed Mar. 6, 2007, Reply filed Sep. 6, 2007.

U.S. Appl. No. 10/952,034, Office Action mailed Mar. 6, 2007.

\* cited by examiner

IDENTIFYING PEOPLE AND AVAILABLE COMMUNICATION MODES

CROSS-REFERENCE TO RELATED APPLICATIONS

This application is a continuation of U.S. application Ser. No. 10/952,034, filed on Sep. 28, 2004, which is a continuation of U.S. application Ser. No. 10/728,374, filed on Dec. 4, 2003, now pending.

TECHNICAL FIELD

This invention generally relates to integrating multiple communication modes.

BACKGROUND

New communication technologies are becoming available on computers. These technologies, primarily based on high speed processors, good connections to high speed data transmission on Ethernet and Internet, and fast rendering of graphics, enable new modes of personal communication on computers such as voice conversation, voice with video conversation, graphic text-based conversation, and electronic mail (e-mail). An example of voice conversation mode of personal communication on computers is Voice delivered over Internet Protocol (VoIP) while an example of graphic text-based conversation mode is Instant Messaging (IM).

VoIP is a term used in Internet Protocol (IP) telephony for a set of facilities for managing the delivery of voice information using the Internet Protocol (IP). In general, this means sending voice information in digital form in discrete packets rather than in the traditional circuit-committed protocols of the public switched telephone network (PSTN). VoIP has generally been implemented for personal communication on computers using voice conversation mode as a replacement for physical telephones. In some examples, the graphical user interface (GUI) created as this replacement has been designed with a keypad designed to emulate the keypad of a physical telephone. Thus, the user must click on different numbers on the GUI keypad to make a phone call.

IM provides the ability to easily determine whether a chosen friend or co-worker is connected to the Internet and, if they are, to exchange messages with them. IM differs from ordinary e-mail in the immediacy of the message exchange and also makes a continued exchange simpler than sending e-mail back and forth. These message exchanges are graphic text-based. In order for IM to work, both users (who must subscribe to the service) must be online at the same time, and the intended recipient must be willing to accept instant messages. If the IM software is set to accept instant messages, the IM software alerts the recipient with a distinctive sound, generates a window that indicates that an incoming message has arrived, and allows the recipient to accept or reject the incoming message or a window containing the incoming message.

Under most conditions, IM is truly "instant." Even during peak Internet usage periods, the delay is rarely more than a second or two. Little or no delay makes it possible for two people to have a real-time online conversation by sending instant messages back and forth to each other.

SUMMARY

In general, in one aspect, there is a method that includes receiving from a first person a request to converse with a second person using any one of two or more selectable communication modes, and in response to the received request, automatically performing an action determined by a rule created by the second person.

Implementations may include one or more other features. The rule is created by the second person using a user interface on a computing device. The method further includes selecting the rule from a set of one or more rules based on a condition statement of the rule. The method further includes selecting the rule based on the one of two or more communication modes. The method further includes selecting the rule based on an identity of the first person. The method further includes selecting the rule based on a current status of the second person. The method further includes determining an electronic document associated with the first person and retrieving the electronic document if the second person indicates a desire to view the document. In some cases, the method further includes displaying the electronic document to the second person. In other cases, the method further includes retrieving the electronic document from an e-mail storage module, wherein the electronic document is an e-mail message. In still other cases, the method further includes retrieving a calendar of the second person from a calendar storage module, wherein the electronic document is the calendar.

Implementations may include one or more other features. Automatically performing the action further includes enabling the first person to leave a message if the current status of the second person is that the second person is unavailable to converse. Automatically performing the action further includes forwarding the request to converse to a third person if a current status of the second person is that the second person is unavailable to converse and the third person is available to converse. The one of two or more communication modes includes a voice conversation communication mode, in some cases, the voice conversation communication mode includes Voice over Internet Protocol (VoIP). The one of two or more communication modes includes a voice/video conversation communication mode. The one of two or more communication modes includes a graphic text-based conversation communications mode, in some cases, the graphic text-based conversation communication mode includes Instant Messaging.

In general, in another aspect, there is a system that includes a computing device that includes a transceiver configured to receive a request to converse with a user of the computing device, and an integration module configured to interact with at least two of voice conversation software, voice-video conversation software, graphic text-based conversation software, fax software, and electronic mail software, and to automatically perform an action determined by a rule created by the user based on the received request.

Implementations may include one or more other features. The integration module includes a microphone and a speaker. The integration module includes a user interface hook to detect when the user is interacting with the computing device. The integration module includes a user interface that enables the user to specify the action. The system further includes a network. The system further includes a second computing device configured to send the request to converse. The system further includes a telephone configured to send the request to converse. The network includes a switched local area network. The transceiver is further configured to receive a request to converse via the switched local area network. The switched local area network is configured to connect the computing device to an internet. The switched local area network is configured to connect the computing device to an intranet. The switched local area network is configured to connect to an internet protocol/public switched telephone network gateway, in some cases, the network further includes a second switched local area network. In such cases, the second computing device can send the request to converse via the second switched local area network. In some cases, the network further includes a telephone system and a public switched telephone network configured to enable the telephone to send the request to converse to the computing device.

In general, in one aspect, there is a method that includes providing to a first person a listing of a set of persons, the listing comprising a name, presence information, and two or more communication modes available to communicate with each person. The method also includes enabling the first person to select a second person from the set of persons, and enabling the first person to select a communication mode from the communication modes available to communicate with the second person.

Implementations may include one or more other features. The method further includes retrieving one or more first letters of a name of the second person, matching the one or more first letters of the name to names of a second set of persons, and presenting the second set of persons to the first person. In some cases, the method further includes enabling the first person to select the second person from the second set of persons. The method further includes enabling the first person to communicate with the second person using the selected communication mode by interfacing with a computer program. The method further includes enabling the first person to communicate with the second person by voice. In some cases, communication by voice uses Voice over Internet Protocol (VoIP). The method further includes enabling the first person to communicate with the second person by voice and video. The method further includes enabling the first person to communicate with the second person by text-based conversation. In some cases, the text-based conversation includes Instant Messaging. The method further includes enabling the first person to communicate with the second person via an e-mail message. The communication modes include at least two of a voice conversation mode, an e-mail mode, a graphic text-based conversation mode, and an voice/video conversation mode. The presence information includes an indicator indicating that the second person is (i) logged into a computer, (ii) at work but not logged into the computer, or (iii) out of the office. The listing further includes status information comprising an indicator indicating that the second person is currently engaged in conversation with a third person. In some cases, the indicator indicates that the second person is currently engaged in conversation using one of a voice conversation mode, a voice/video conversation mode, and a graphic text-based conversation mode. The method further includes querying a database for information about the set of persons.

In general, in another aspect, there is a system that includes a user interface module configured to generate a listing of a set of persons, the listing comprising a name, presence information, and communication modes available to communicate with each person. The user interface module is also configured to enable a user to select a person from the set of persons, and enable the user to select a communication mode from the communication modes available to communicate with the selected person.

Implementations may include one or more other features. The user interface is further configured to interface with a computer program providing at least one of the communication modes. The user interface is further configured to interface with a computer program providing at least a portion of the presence information. The system further includes a database including information about the set of persons. The user interface module further includes a user interface hook to detect when the user is interacting with the computing device.

In general, in another aspect, there is a communication integration environment that includes an integration module configured to interact with at least two of voice conversation software, voice-video conversation software, graphic text-based conversation software, fax software, and electronic mail software, and to automatically perform an action determined by a rule created by the user based on the received request. The environment also includes a user interface module configured to generate a listing of a set of persons, the listing comprising a name, presence information, and communication modes available to communicate with each person. The user interface module is also configured to enable a user to select a person from the set of persons, and enable the user to select a communication mode from the communication modes available to communicate with the selected person.

In general, in another aspect, there is a system that includes a computer device, a user interface that is configured to enable a user to interact with a person using one of at least two of voice conversation, voice-video conversation, graphic text-based conversation, fax, and electronic mail; wherein the interaction includes the following. Creating a rule to cause the computer device to automatically perform an action based on a request to converse with the user. Viewing an automatically generated listing of a set of persons, the listing comprising a name, presence information, and communication modes available for the user to communicate with the person from the set of persons. Selecting the person from the set of persons. Selecting a communication mode from the communication modes available to communicate with the person. Retrieving information about a person using an identifying characteristic of the person, and the identifying characteristic being selected by the user from a display. Communicating with the person.

In general, in another aspect, there is a method that includes enabling a first person to select an identifying characteristic of a second person in a display provided by a first computer program, automatically retrieving, using a second computer program, information about the second person using the identifying characteristic of the second person and a type of the characteristic, and enabling the first person to select from the communication modes available to contact the second person.

Implementations may include one or more other features. Retrieving further includes determining the type of characteristic. The method further includes determining the communication modes available to communicate with the second person based on the identifying characteristic of the second person. The method further includes determining the communication modes available to communicate with the second person based on the type of characteristic. The method further includes enabling the first person to communicate with the second person using the selected communication mode. In some cases, enabling the first person to communicate with the second person further includes interfacing with a third computer program. The method further includes determining a communication mode identifier associated with the second person for at least one of the communication modes available to contact the second person. The communication modes include at least two of a voice conversation mode, an e-mail mode, a graphic text-based conversation mode, and an voice/video conversation mode. The method further includes displaying at least one of a name associated with the second person, presence information associated with the second person, and status information associated with the second person. The presence information includes an indicator indicating that the second person is (i) logged into a computer, (ii) at work but not logged into a computer, (iii) out of the office. The status information includes an indicator indicating that the second person is currently engaged in conversation with another person. In some cases, the indicator indicates that the second person is currently engaged in conversation using one of voice conversation mode, voice/video conversation mode, and graphic text-based conversation mode.

Implementations may include one or more other features. The method further includes enabling the first person to communicate with the second person by voice. Communication by voice uses Voice over Internet Protocol (VoIP). The method further includes enabling the first person to communicate with the second person by voice and video. The method further includes enabling the first person to communicate with the second person by text-based conversation. In some cases, the text-based conversation uses Instant Messaging. The method further includes enabling the first person to communicate with the second person via an e-mail message. Enabling the first person to select an identifying characteristic of the second person further includes highlighting the identifying characteristic. The identifying characteristic includes a name of the second person. The identifying characteristic includes a telephone number of the second person. The method further includes performing optical character recognition on an image of the identifying characteristic. The identifying characteristic includes an image of the second person.

In general, in another aspect, there is a system that includes a retrieval module configured to automatically retrieve information about a first person using an identifying characteristic of the first person, and the identifying characteristic being selected by a second person from a display, and a selection module configured to enable the second person to select from communication modes available to communicate with the first person.

Implementations may include one or more other features. The system further includes a network. The selection module is further configured to interface with a computer program to provide the second person with one of the communication modes available to communicate with the first person. The system further includes a display module to display at least one of a name associated with the first person, presence information associated with the first person, and status information associated with the first person. In some cases, the presence information includes an indicator indicating that the first person is (i) logged into a computer, (ii) at work but not logged into a computer, (iii) out of the office. In other cases, the status information includes an indicator indicating that the first person is currently engaged in conversation with another person. In these cases, the indicator can indicate that the first person is currently engaged in conversation using one of voice conversation mode, voice/video conversation mode, and graphic text-based conversation mode. The selection module includes a user interface hook to detect when the user is interacting with the computing device.

In general, in another aspect, there is a system that includes a computer device and a user interface. The user interface is configured to enable a user to interact with a person using one of at least two of voice conversation, voice-video conversation, graphic text-based conversation, fax, and electronic mail. The interaction includes the following. Creating a rule to cause the computer device to automatically perform an action based on a request to converse with the user; viewing an automatically generated listing of a set of persons, the listing comprising a name, presence information, and communication modes available for the user to communicate with the person from the set of persons. Selecting the person from the set of persons. Selecting a communication mode from the communication modes available to communicate with the person; retrieving information about a person using an identifying characteristic of the person, where the identifying characteristic is selected by the user from a display. Communicating with the person.

In general, in another aspect there is a computer program product residing on a computer storage readable medium, the computer program product comprising executable instruction that cause a processor to perform one or more of the methods described above.

These and other embodiments may have one or more of the following advantages.

Multiple modes of personal communication on computers are integrated together with a contact list and user's preferences to improve the user's communication with others. The communication is improved by enabling the user to specify the identity of another person using convenient techniques, view presence information about the other person, and then specify the desired mode of communication with the other person by simply selecting the desired mode from the integrated multiple modes. The communication is also improved by enabling the user to set up rules that determine how incoming requests for communication with the user are automatically handled.

In a corporate environment, integrating the multiple modes of personal communication on computers enables the user's entire computer-based communication environment to follow the user from a computer in an office to another computer in another office. This can allow office communication equipment, such as a phone and a desktop computer, to remain at one physical location and the employee's communication environment to follow that employee, reappearing when the employee logs into another computer in another office.

The details of one or more examples are set forth in the accompanying drawings and the description below.

DETAILED DESCRIPTION

Figure 1:
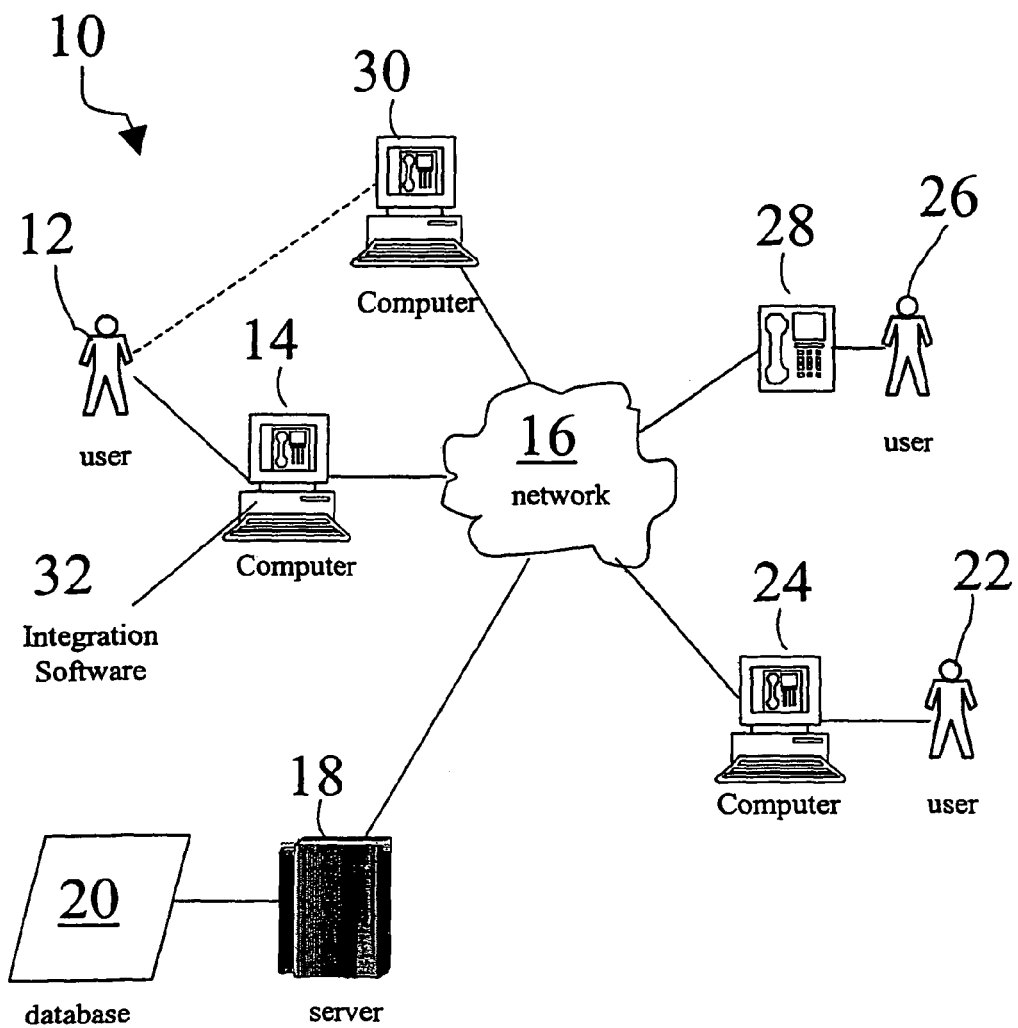
FIG. 1 is a view of a communication system environment.

Referring to FIG. 1, communication system 10 includes voice-enabled computer 14, network 16, voice-enabled computer 24, telephone 28, and voice-enabled computer 30. Computers 14, 24, and 30 are computing devices that can include, for example, desktop computers and/or handheld computers. Computer 14, computer 24, and computer 30 operate according to instructions in integration software 32. Integration software 32 integrates multiple modes of personal communication on each computer and provides an interface to a user 12 using a single graphical user interface (GUI). Examples of the multiple modes of personal communication can include voice conversation (e.g., VoIP), voice-video conversation, graphic text-based conversation (e.g., IM), or other forms of graphic text-based communication such as fax or electronic mail (e-mail). User 12 uses voice-enabled computer 14 to communicate with users 22 and 26 via network 16. User 22 uses voice-enabled computer 24 while user 26 uses telephone 28. Computer 14 has access to server 18 that is connected to database 20. User 12 communicates using one or more of the multiple modes of personal communication on computer 14. Database 20 stores the communication preferences of user 22 and the identities as well as communication addresses of users 22 and 26. Although database 22 is a separate entity in the illustrated example, database 22 or portions of database 22 can be distributed and/or included on a computing device, such as 14, 24, and/or 30.

In system 10, voice conversation mode of personal communication via computer 24, in addition to other modes of personal communication, is controlled by instructions executed by computer 14 and components of these modes of personal communication are represented by data in database 20. Thus, these components can be manipulated, stored, categorized, accessed, and moved around network 16 like any other form of data. For example, integration software 32 enables user 12 to set instructions to forward or store a voice message using the same user interface as forwarding an e-mail message. These instructions and the components of the modes of personal communication are stored in database 20. User 12 may also log into computer 30 and have access to the same information on computer 30 from database 20 as by logging into computer 14. In corporate environments, for example, users can move around between different locations providing computers such as computer 14 and computer 30. These different locations can include, for example, user 12's permanent office, user 12's colleague's office, a conference room over wireless LAN connection, an airport lounge with a Virtual Private Network (VPN) connection to user 12's employer, and user 12's home office with a VPN connection to server 18. No matter where user 12 is logged in using computer 14, 24, or 30, accessibility and control over these multiple modes of personal communication on computers are available to user 12.

If user 12 is logged in at computers 14 and 30 concurrently and user 22 sends a request to converse to user 12, then computers 14 and 30 can both indicate the arrival of the request for conversation. If user 12 does not answer at either computer 14 or 30, then, based on the instructions of user 12, integration software 32 can deliver a message from user 22 to a mailbox stored in database 20, accessible at either computer 14 or 30.

When either user 22 or user 26 sends a request for conversation to user 12 and user 12 is logged in on computer 14, integration software 32 on computer 14 detects the identity of either user 22 or user 26. A request to converse can include, for example, an incoming phone call using VoIP or an incoming instant message. When the request is for voice conversation, integration software 32 on computer 14 detects the identity based on, for example, the automatic number identification (ANI) information provided with the telephone call by matching the ANI with the requester's identity in database 20. Other requests for conversation can directly contain the identity of the requesting user.

When either user 22 or user 26 sends a request for conversation to user 12 and user 12 is logged in on computer 14, computer 14 can use the identity of the requesting user to search different contact and address lists in database 20 and display as much information about the incoming call and user 22 or 26 as computer 14 is able to retrieve from database 20. Such information can include, for example, user 22's or 26's organization, title, and/or photo. Based on a simple action by user 12 using a GUI, integration software 32 on computer 14 can also retrieve associated documents, such as recent e-mail correspondence to or from user 22 or 26, stored in database 20 so that this recent correspondence is available during conversation. In another example, integration software 32 on computer 14 can also retrieve calendar information for user 22 or 26 in database 20 so that the availability of user 22 or 26 is available during the conversation based on a simple action by user 12. This GUI is described in greater detail below.

When user 12 goes on vacation, user 12 can use integration software 32 to set a vacation message (once) in a computer desktop environment setting to store the message in database 20, and integration software 32 can configure all of the communication modes available to user 12 based on that single vacation message.

Using integration software 32, user 12 can manage communication distribution groups (e.g., groups in the Global Address List) in one place and communicate with these groups using any of the multiple modes of personal communication.

While preparing to send an e-mail to a list including users 22 and 26, user 12 decides to include voice annotation associated with the e-mail. Because integration software 32 coordinates with the various modes of personal communication, user 12 can include the voice annotation in the e-mail, or user 12 can initiate an immediate synchronous phone connection to all users in the list including users 22 and 26.

A set of rules defined by user 12 does a portion of the integration of multiple modes of personal communication on a computer for user 12. User 12 uses a rules assistant in the form of a GUI to specify these rules, as discussed in greater detail below. Using this rules assistant, user 12 can specify actions computer 14 should take when certain events such as an incoming request to converse, from user 22 to user 12, arrives at computer 14. The condition statements of these rules specify the parameters of events. These parameters include, for example, the identity of user 22 (the sender), the mode of conversation used, a date and time range, and the current status of user 12 (the recipient). In an illustrative example, conditions of a particular rule include receipt of a voice call and user 12 is out of the office. In defining a rule for this example, user 12 can specify actions such as send the voice call to voice mail, disconnect the voice call, or forward the voice call to some other user.

Figure 2:
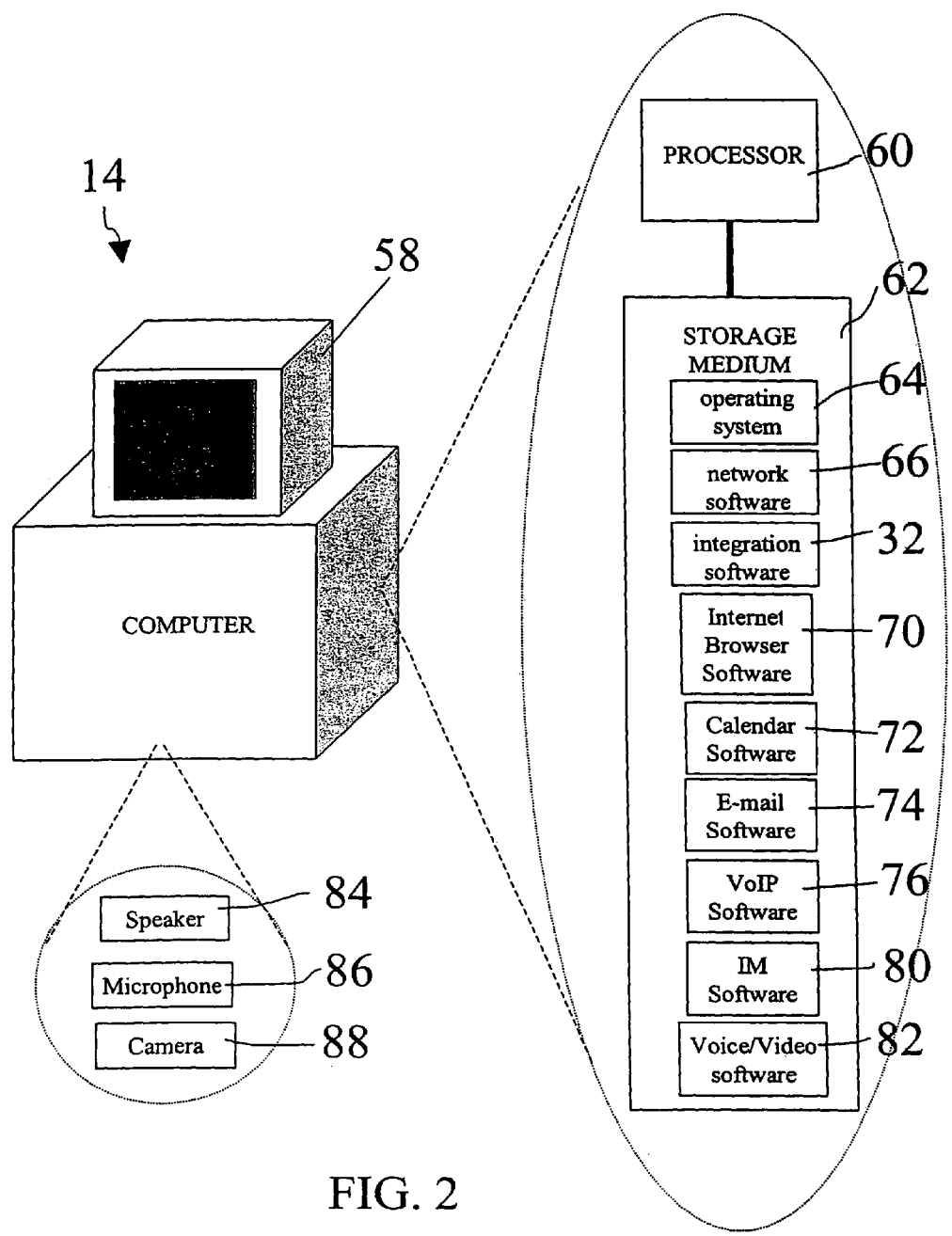
FIG. 2 is a view of a computer.

Referring to FIG. 2, computer 14 includes monitor 58, processor 60, and storage medium 62. Processor 60 executes instructions stored in storage medium 62 while monitor 58 displays graphical output from processor 60. Storage medium 62 stores operating system 64, network software 66, and applications. Applications include integration software 32 that integrates multiple communication modes for user 12 on computer 14. Applications also include Internet browser software 70, calendar software 72, e-mail software 74, VoIP software 76, IM software 80, and voice/video communication software 82. Computer 14 also includes one or more speakers 84, microphone 86, and camera 88. VoIP software 76 uses speaker 84 to transmit speech from user 22 or user 26 to user 12 while VoIP software 76 uses microphone 86 to record speech from user 12. Voice/video communication software 82 uses speaker 84 and microphone 86 in a similar way as VoIP software and also uses camera 88 to record video of user 12.

One example of Internet browser software 70 is available as Internet Explorer® from Microsoft Corporation of Redmond, Wash. One example of calendar software 72 is available as Outlook® software from Microsoft Corporation of Redmond, Wash. One example of e-mail software 74 is also available as Outlook® software from Microsoft Corporation of Redmond, Wash. One example of VoIP software 76 is available as WinRTP® as source code from Vovida.org and another example as Telephony Application Programmer's Interface® (TAPI) software from Microsoft Corporation of Redmond, Wash. One example of voice/video communication software 82 is available as Eyeball Chat® from Eyeball Networks of Vancouver, BC, Canada.

Integration software 32 incorporates a rules assistant function to enable user 12 to setup rules determining how incoming communication is handled. Integration software 32 also interacts with Application Programmer's Interfaces (APIs) in software 70, 72, 74, 76, 80, and 82 to integrate multiple communication modes for user 12 on computer 14. This integration includes reading electronic information stored by software 70, 72, 74, 76, 80, and 82 and launching the execution of components of software 70, 72, 74, 76, 80, and 82. Examples of this integration are discussed in greater detail below.

Figure 3:
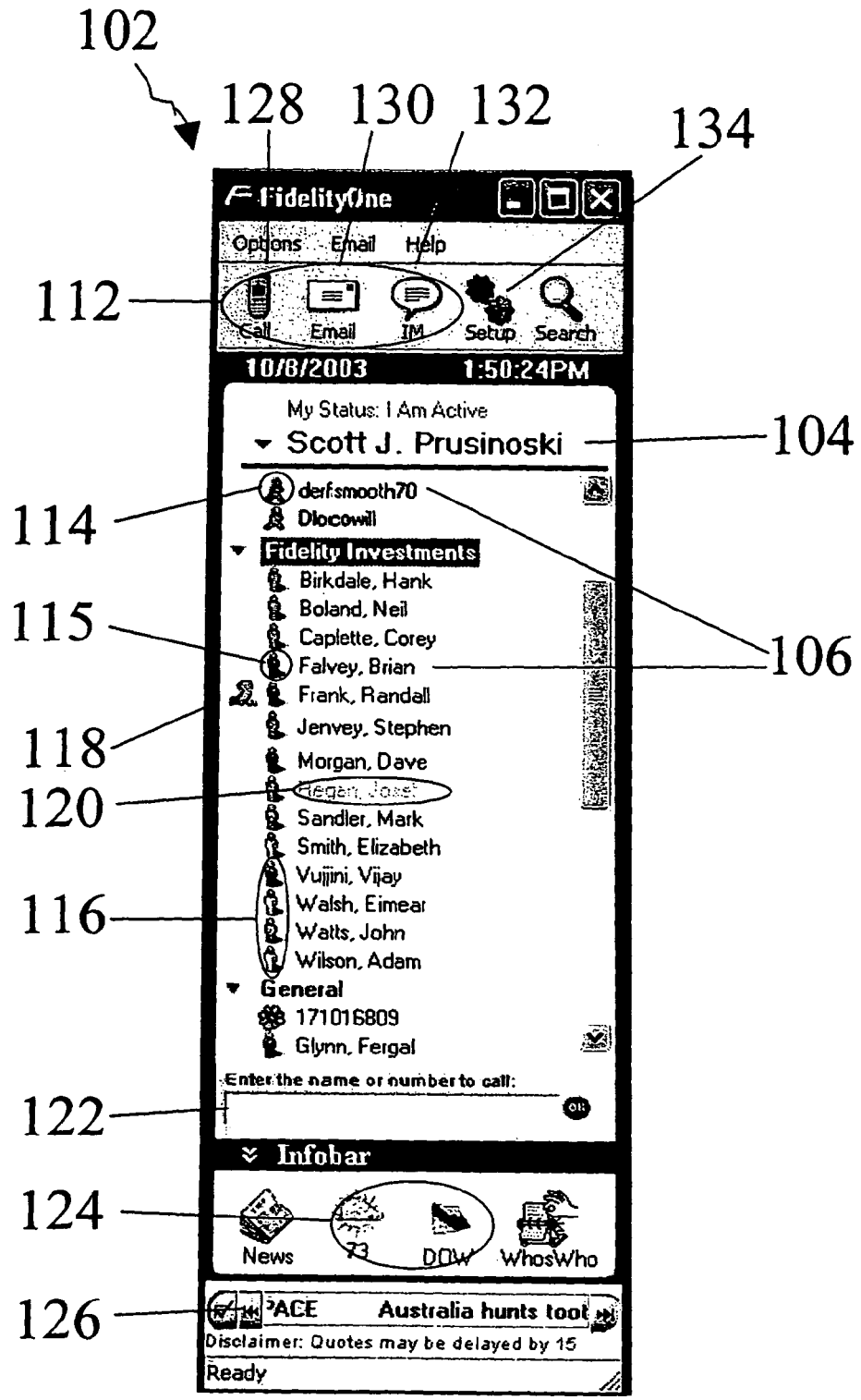
FIG. 3 is a view of a user interface to integrate multiple modes of personal communication on a computer.

Referring to FIG. 3, integration software 32 provides a Graphical User Interface (GUI) 102 that provides a person-centric interface that enables user 12 to contact user 28 from a list of known persons using multiple communication modes via computer 14. In the illustrated example, these modes include a voice conversation mode, facilitated by VoIP software 76, and graphic text-based conversation mode, facilitated by IM software 80, as well as e-mail communication mode, facilitated by e-mail software 74. GUI 102 includes area 112 with available communication modes. Area 112 includes button 128 (to specify VoIP communication), button 130 (to specify e-mail), and button 132 (to specify IM communication).

GUI 102 also presents the name 104 of user 12 and a list of contacts 106. For each contact in list 106 in GUI 102, when user 12 selects that particular contact, the buttons 112 representing communication modes that are available for communication with that contact selected from list 106 are activated, while buttons 112 representing communication modes that are not available for communication with that contact selected from list 106 are deactivated. Thus, GUI 102 provides user 12, in a single interface, with a list of communication modes that are available to communicate with a selected contact from list 106, even though applications providing that mode of communication are independent of GUI 102. In GUI 102, icons 114 and 115 show different IM providers that are available for a contact. Icon 118 shows whether the contact is currently using a phone, and name 120 of the contact is color coded to reflect calendar information of the contact in list 106. In an example that uses Outlook® as calendar software 72, GUI 102 can perform the color-coding of the names according to the Outlook® status of an individual and uses the same color-coding as found in Outlook®. In that case, blue means busy, purple means out of office, and light blue means tentative. Area 122 provides one way for user 12 to specify the identity of user 22 to contact by typing in the name or telephone number of user 22. Areas 124 and 126 present auxiliary information to user 22 such as weather, stock market conditions, and news.

To communicate with user 22 or user 26, user 12 first identifies user 22 or user 26 using GUI 102. User 12 does this by clicking on a name in list 106 or typing in an identifier in area 122. This identifier enables user 12 to identify a person not in list 106 but who is in database 20. This identifier may be a name of a person in one or more databases 20, where the name can be a nickname or user name, or a telephone number in database 20 with a match to a person. This identifier can also be a string of alphabetic characters of the beginning of the name of a person in database 20. In general, if the identifier does not uniquely identify a person in database 20, a sublist of persons is presented to the user and the user can select a person from this sublist. Otherwise, if the person is uniquely identified, integration software 32 initiates the communication process with the identified person. Before identifying which person to communicate with, user 12 can check the presence information of persons in list 106.

The icons 114 and 115 of a person standing or running indicate support for different IM services managed by IM software 80. For example, the running person icon is representative of the AOL® IM service, the person standing is a Fidelity One contact. Other examples include icons of a Y for Yahoo®, a flower for ICQ®, and a pawn looking icon for MSN Messenger®. Icons 114 and 115 are shaded, representing the state of the user in relation of the user's IM usage. Green means that the user is currently engaged in an IM conversation, red means the user is away from the office, blue means do not disturb the person, gray means the user is at work but not logged into the computer, and white means the user has no presence information. The phone icon 118 means that Brian Falvey is currently speaking on a VoIP phone. The shading of name 120 indicates the office calendar status of user 12. GUI 102 interacts with calendar software 72 to determine the calendar status of user 12. For example, Outlook® software allows user 102 to set his or her current status at any given time as free, tentative, busy, or out of the office.

Once user 12 has identified a person to communicate with, user 12 can choose a mode of communication in area 112. If user 12 wishes to converse with user 22, user 12 can click on button 128 for voice conversation mode of personal communication using VoIP software 76 or click on button 132 for graphic text-based conversation in the form of IM using IM software 80. Otherwise, user 12 can initiate graphic text-based communication in the form of e-mail using e-mail software 74 by clicking on button 130. In other examples, other buttons enable user 12 to choose other modes of personal communication not illustrated, such as voice/video conversation using voice/video software 82.

Figure 3A:
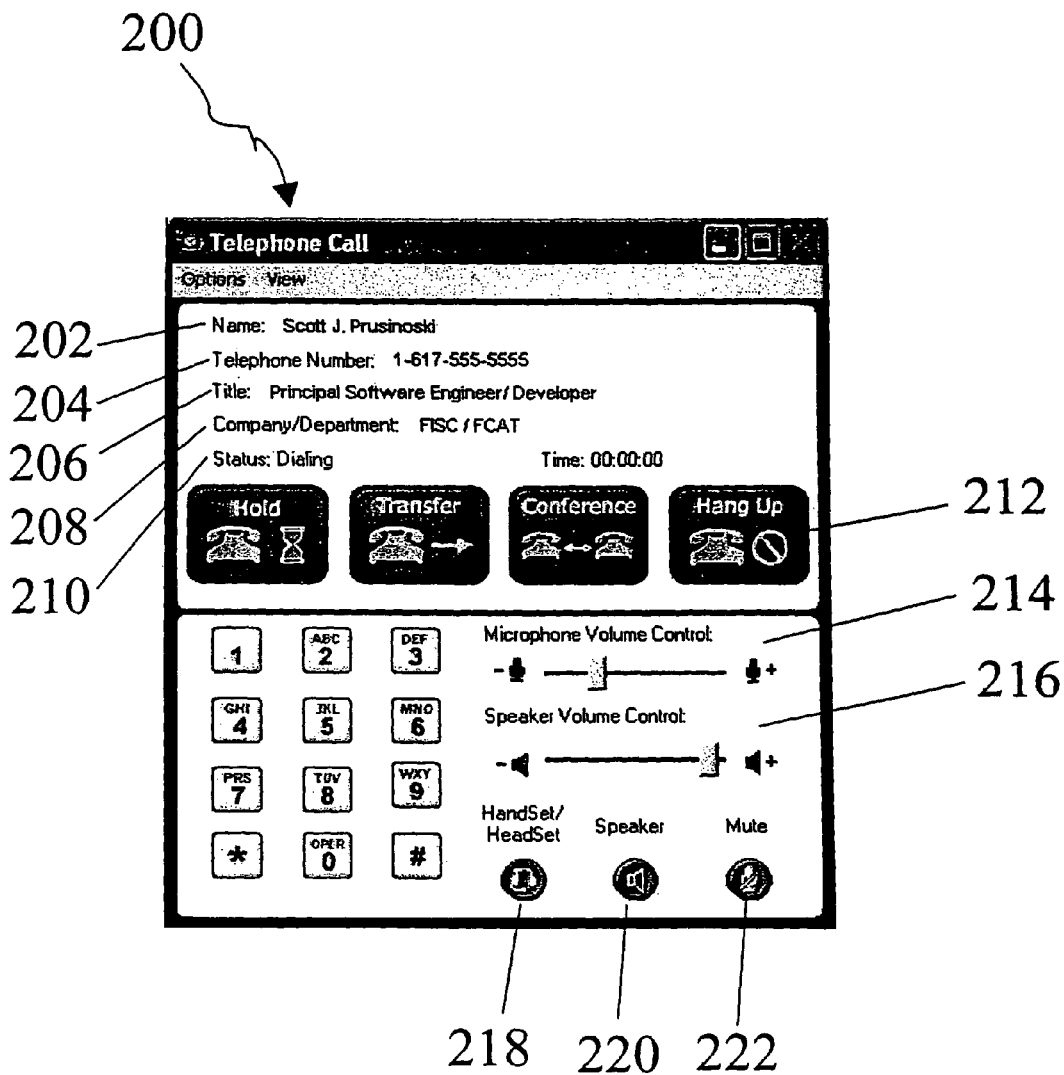
FIG. 3A is a view of a user interface for voice conversation mode of personal communication.

Referring to FIG. 3A, integration software 32 responds to user 12 clicking on button 128 by retrieving a telephone number and other information for a contact specified by user 12 in database 20. Integration software 32 then launches the execution of VoIP software 76 that presents GUI 200 to user 12. GUI 200 shows information about the VoIP call. Information for GUI 200 is gathered from database 20. GUI 200 includes name 202 of user 22 or user 26 with whom user 12 wishes to communicate. GUI 200 also includes telephone number 204 of user 22 or user 26. Additional information about user 22 or user 26 includes title 206 and company 208. Because integration software 32 integrates multiples modes of communication, integration software 32 can display other information about user 22 obtained from database 20 or through other applications (e.g., 72, 74, 76, 80, and 82) that have access to information about user 22. Status 210 indicates the status of the VoIP call. This status can be, for example, "Dialing" or "Connected". Button 212 enables user 12 to end the conversation. Control 214 enables user 12 to change the volume for microphone 86 while control 216 enables user 12 to change the volume control for computer speaker 84.

Figure 4:
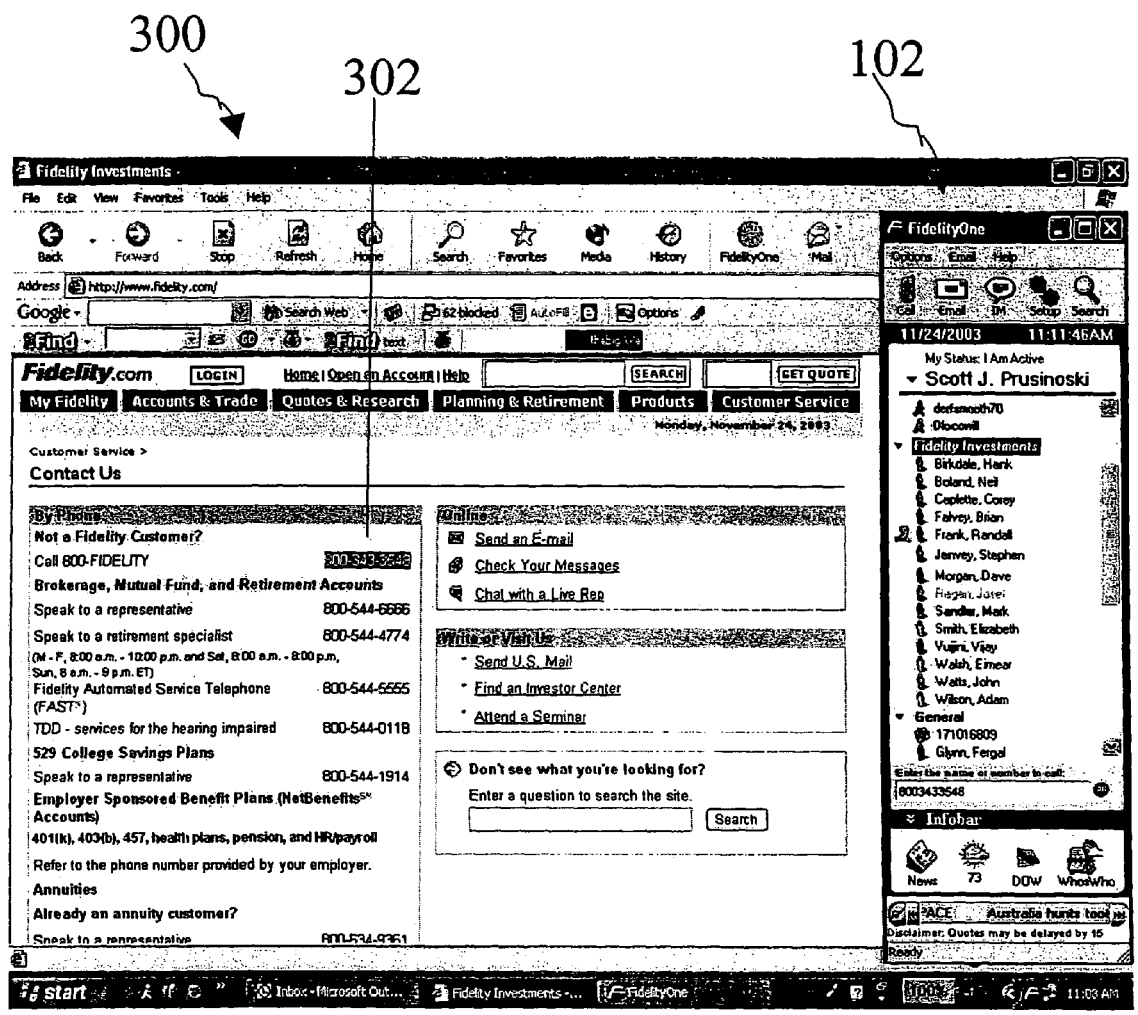
FIG. 4 is a view of an Internet web browser with the text of a telephone number highlighted.
Figure 4A:
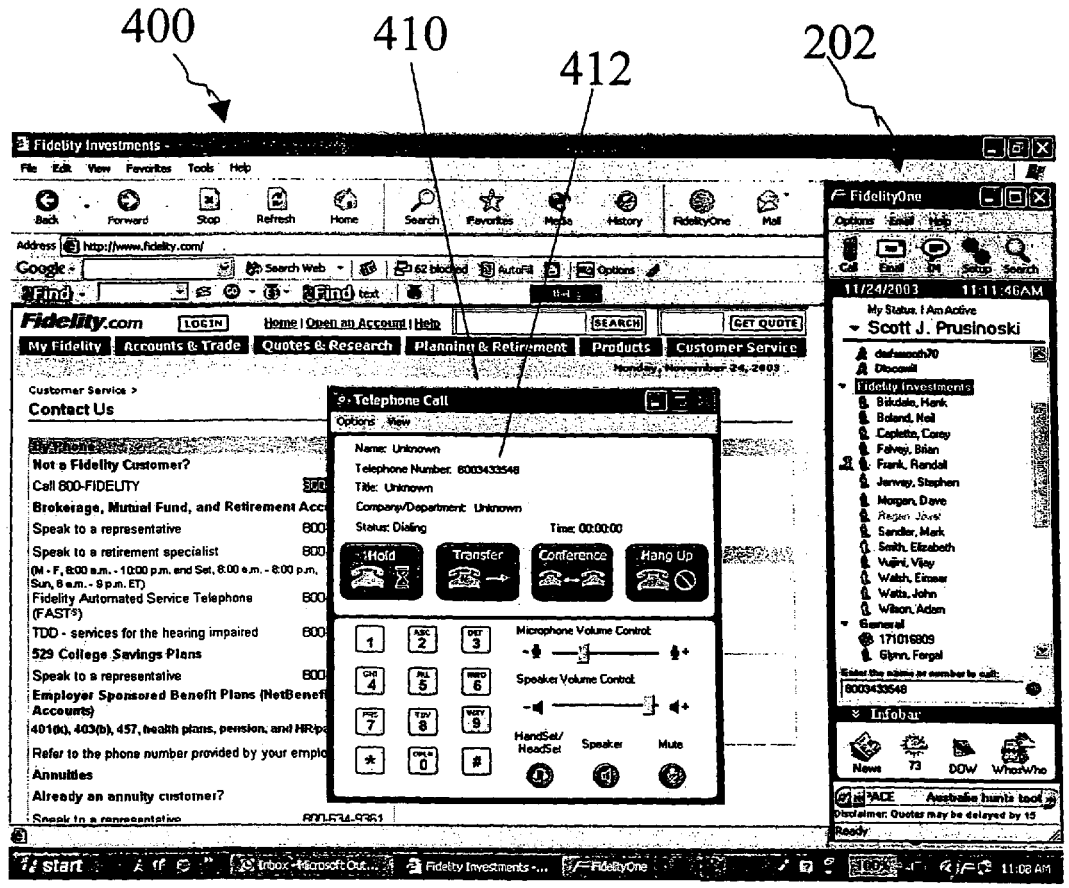
FIG. 4A is view of a user interface for voice conversation mode of personal communication after highlighting a telephone number in the web browser of FIG. 4.

Referring to FIG. 4, Internet browser software 70 provides GUI 300. Integration software 32, running in the background of Internet browser software 70 or some other software with a text GUI, coordinates with Internet browser software 70 and the other software to enable user 12 to communicate with user 22 or user 26 regardless of the software generating a display. For example, user 12 selects text 302 of a telephone number in GUI 300 generated by software 70. After selecting text 302, user 12 hits a "hot" key combination, such as CTRL D, that is programmed using the rules assistant. Integration software 32, running in the background of Internet browser software 70, detects the event of the "hot" key combination and reads the selected text. Integration software 32 determines that the type of the selected text is a number and determines that, because the format of the number is 3 digits, hyphen, 3 digits, hyphen, four digits, the number is a telephone number. Integration software 32 launches the execution of VoIP software 76 that brings up GUI 410, as shown in FIG. 4A, and passes the telephone number, converted from the selected text, to VoIP software 76. GUI 410 enables user 12 to call via VoIP the number selected in text 302. The same number appears in box 412.

In the previous example, because the chosen text was determined to be a phone number, integration software 32 automatically selected the communication mode of voice conversation. The selected text is not, however, always in the form of a phone number. In other examples, this selected text can be another identifying characteristic of a contact in database 20. In addition to a phone number, other identifying characteristics can include, for example ASCII characters representing the name of a contact or an image associated with a contact, such as scanned in text or a graphical image.

In one example where the identify characteristic is ASCII characters representing the name of a contact, user 12 selects text containing the name of a contact in database 20 and hits the "hot" key combination. Integration software 32, running in the background of Internet browser software 70 or other software, detects the event of the "hot" key combination and reads the selected text. Integration software 32 determines that the selected text includes alphabetic text, that the type of the text is a name, and that the name is an identifying characteristic of a contact in database 20. Integration software 32 matches the name to the contact in database 20. Integration software 32 provides GUI 102 to user 12 with the contact selected and enables user 12 to select the mode of communication in area 112. In the case where user 12 selects voice conversation mode, using button 128, integration software 32 launches the execution of VoIP software 76 and passes the telephone number for the contact, retrieved from database 20, to VoIP software 76.

In another example where the text is in a scanned image, user 12 selects the applicable portion of the image in Internet browser software 70 or some other software and hits the correct "hot" key combination. This graphic image contains text of an identifying characteristic such as a name of a contact in database 20. If the text is numeric, then the text represents a telephone number that can be matched to a name of the contact in database 20. If the text is alphabetic, then the type of text is a name that is possibly known as a contact in database 20. Integration software 32 performs optical character recognition to convert the image to ASCII text and to determine the identifying characteristic such as a name or telephone number. Integration software 32 compares the ASCII identifying characteristic with data in database 20 to determine a match. Integration software 32 provides GUI 102 to user 12 with the contact selected and enables user 12 to select the mode of personal communication in area 112 as in the previous examples.

Figure 5:
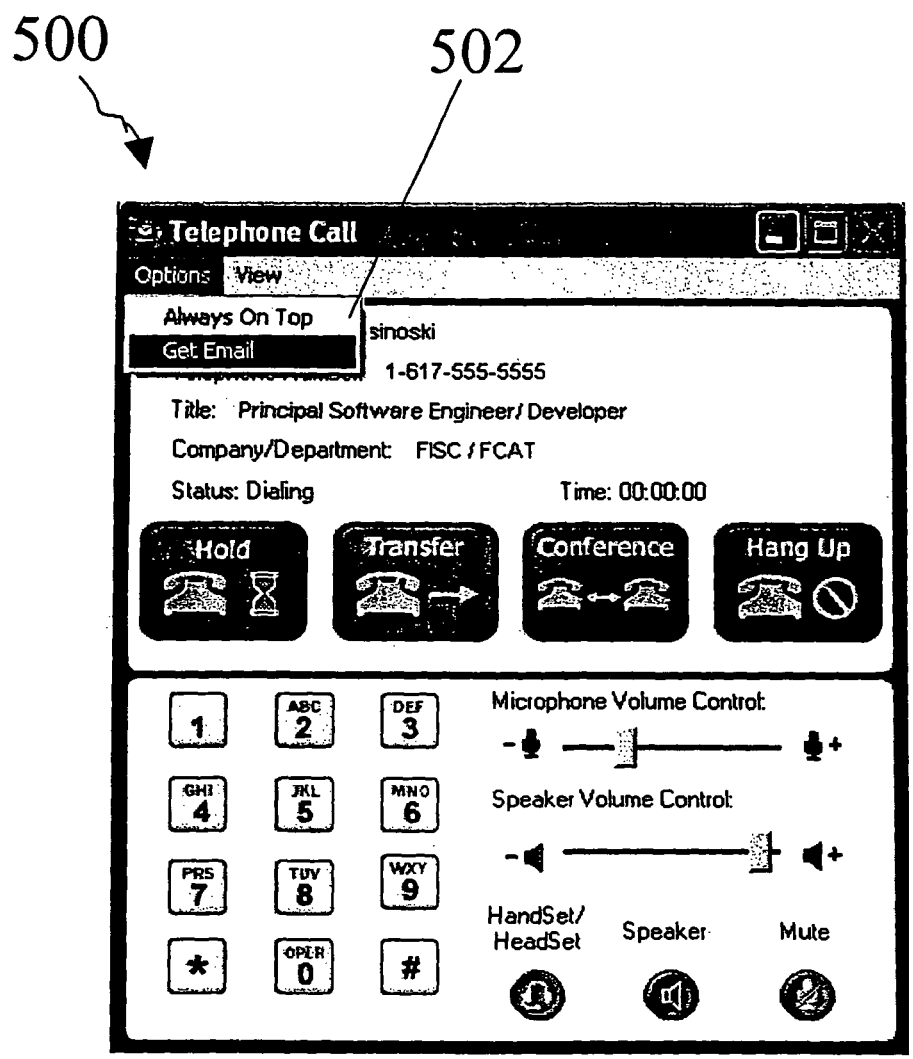
FIG. 5 is a view of a user interface of a rules assistant with a rule.

In another example, user 12 selects a graphic image in Internet browser software 70 or some other software and hits the correct "hot" key combination. This graphic image contains an identifying characteristic, such as a image of the face of a contact in database 20. After determining that the graphic image does not represent numeric or alphabetic characters, integration software 32 determines that the type of image is an image of the face of a contact in database 20. Integration software 32, performs image pattern recognition to identify the contact in database 20. Integration software 32, provides GUI 102 to user 12 with the contact selected and enables user 12 to select the mode of communication in area 112 as in the previous examples. Software for such facial image pattern recognition is available, for example, from SeeStorm USA of Encinitas, Calif. Referring to FIG. 5, integration software 32 includes GUI 500 to enable user 12 to bring up all e-mails from user 22 when user 22 requests a voice conversation with user 12 and user 12 is in the office. In operation, upon receiving the request to converse from user 22, GUI 500 appears and user 22 can indicate a desire to view the e-mails by selecting menu item 502. When user 12 selects menu item 502, integration software 32 brings up stored e-mails from user 22 for assisting user 12 in conversation with user 22. Integration software 32 can retrieve these stored e-mails from database 20 and/or e-mail software 74. Integration software 32 displays the stored e-mails using e-mail software 74.

In another example, a similar GUI enables user 22 to bring up calendar information for user 22 so that the availability of user 22 is visible to user 12 during the conversation. Integration software 32 can retrieve this calendar information from database 20 and/or calendar software 72. Integration software 32 displays this calendar information through interaction with calendar software 72.

Figure 6:
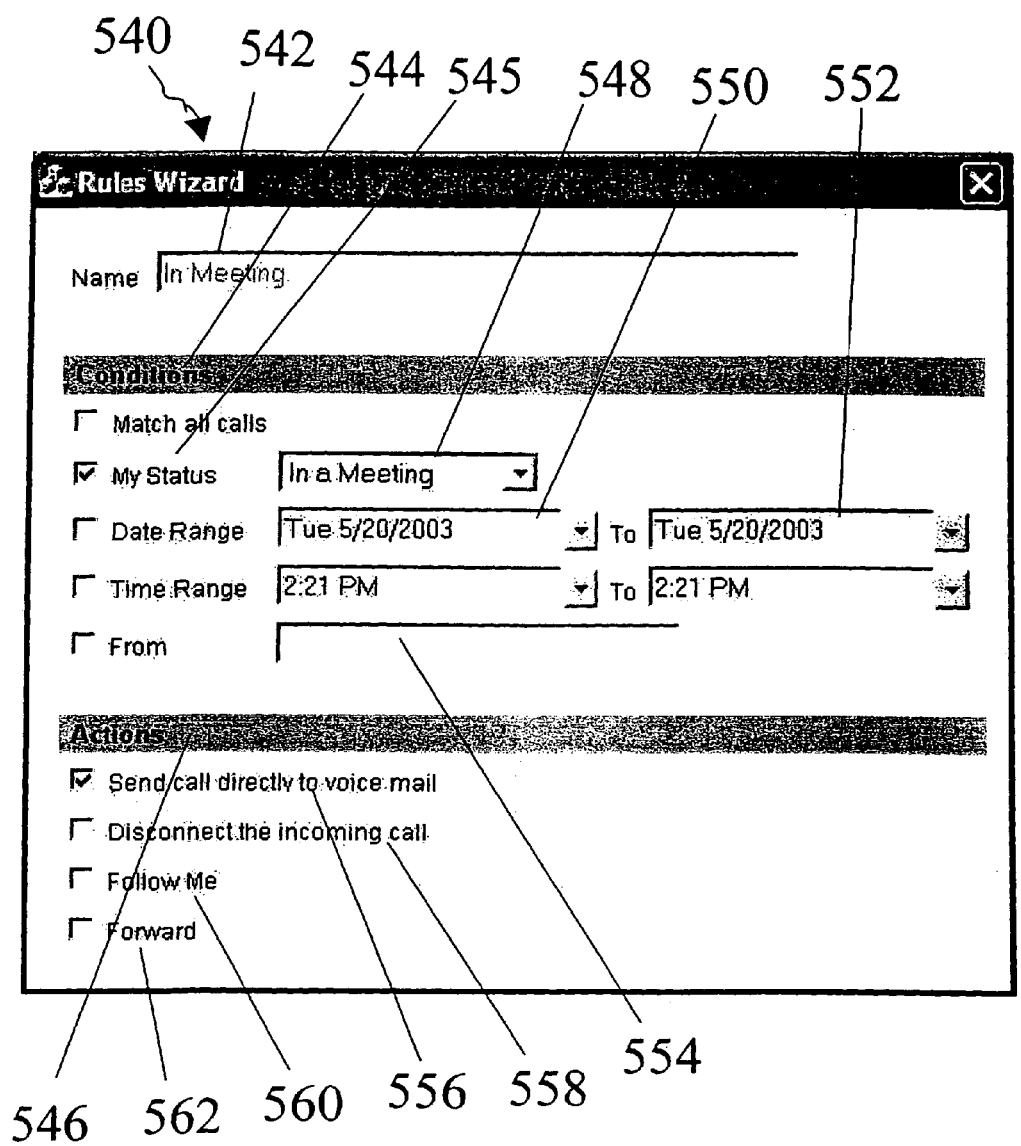
FIG. 6 is a view of a user interface for voice conversation mode of personal communication enabling a user to bring up documents associated with the caller.

Referring to FIG. 6, GUI 540 shows an example of a rule created by user 12 using the rules assistant. In the illustrated example, GUI 540 enables user 12 to program a rule when another user (e.g., user 22) wants to initiate conversation with user 12 via voice. In this case, user 12 names the rule in box 542 as "In Meeting". User 12 can set the conditions for the rule in area 544 and the actions for the rule in area 546. In area 544, user 12 can set the condition for the status of user 12 by clicking on box 545 and selecting from pull down menu 548. In this case, user 12 clicks on box 546 and selects the status "In a Meeting". Other status conditions in pull down menu 548 include "On Vacation", "Sick", "At Work On Computer", and "At Work but Not On Computer". User 12 also can set the date and time range when the rule applies. The date range is from date in box 550 to date in box 552. User 12 can specify the condition for the name of user 22 who requests conversation with user 12 in box 554. Lastly, for this example, GUI 540 provides four possible actions in area 546 to be automatically performed by computer 14 if user 22 initiates a voice call to user 12 and the conditions specified in area 544 are true. By selecting box 556, user 12 specifies that computer 14 sends the call directly to voice mail. By selecting box 558, user 12 specifies that computer 14 disconnects the call. By selecting box 560, user 12 specifies that computer 14 forwards the call to wherever user 12 is currently located. By selecting box 562, user 12 specifies that computer 14 forwards the call to another user listed in database 20.

Figure 7:
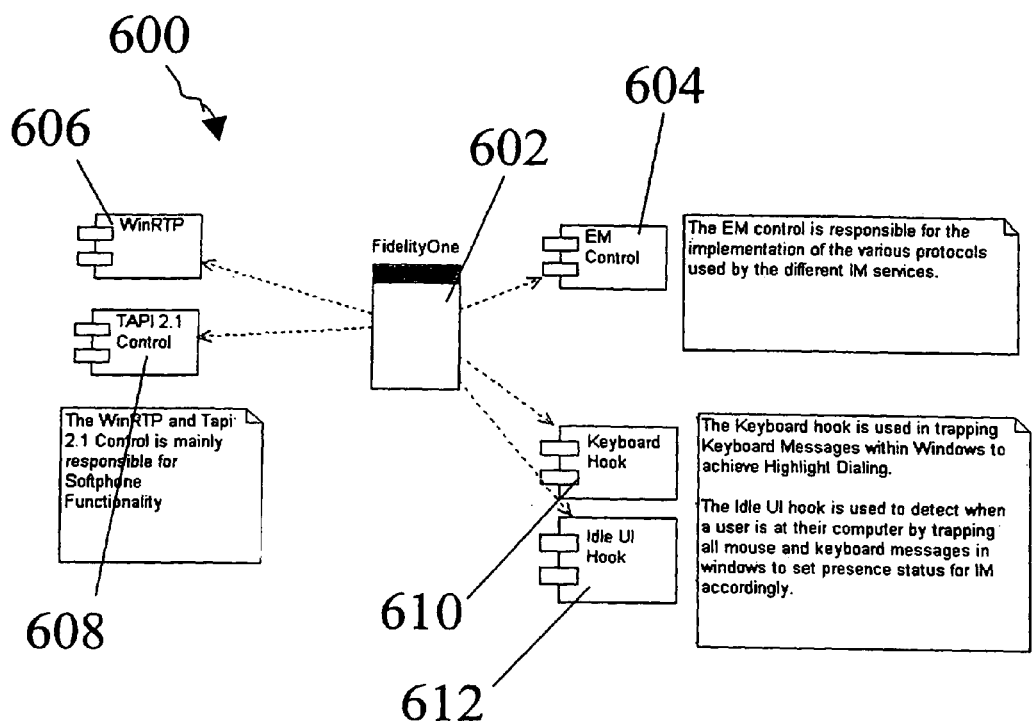
FIG. 7 is a view of components of communication integration software.

Referring to FIG. 7, Fidelity One software 602 is an example of integration software 32 for the Windows® operating system. Fidelity One software 602 interacts with WinRTP software 606 and TAPI Control software 608 to provide VoIP services to user 12. The Real-Time Transport Protocol (RTP) is an Internet protocol standard that specifies a way for programs to manage the real-time transmission of multimedia data over either unicast or multicast network services. Win-RTP is a Component Object Model (COM) component that can originate RTP media from a microphone and terminate RTP media on a speaker. That is, WinRTP encodes and decodes RTP packets. WinRTP consists of two independent parts. One part has the ability to capture the user's voice using microphone 86, encode the user's voice, and send the voice as an RTP stream to a configurable destination. The other part listens for an RTP stream from the network, extracts the audio from the RTP stream, and plays the extracted audio using speaker 84. COM is the fundamental "object model" on which ActiveX Controls and OLE are built. COM allows an object to expose its functionality to other components and to host applications. COM defines both how the object exposes itself and how this exposure works across processes and across networks. COM also defines the object's life cycle. This makes WinRTP easy to use using any programming language like C, C++, or Java (using J/Direct).

TAPI (Telephony Application Program Interface) software 608 is a standard program interface that lets a computer communicate over telephones or video phones to people or phone-connected resources elsewhere in the world.

Integration software 32 also links to Easy Message® (EM) Control software 604 to use different IM services. EM is a unified instant messenger that provides support for IM providers such as ICQ®, MSN®, Yahoo®, and AOL® at the same time.

Keyboard hook 610 is used in trapping keyboard messages to achieve high speed dialing. The idle User Interface (UI) hook 612 is used to detect when a user is at their keyboard by trapping all mouse and keyboard messages in Windows® to set presence status for IM.

Figure 8:
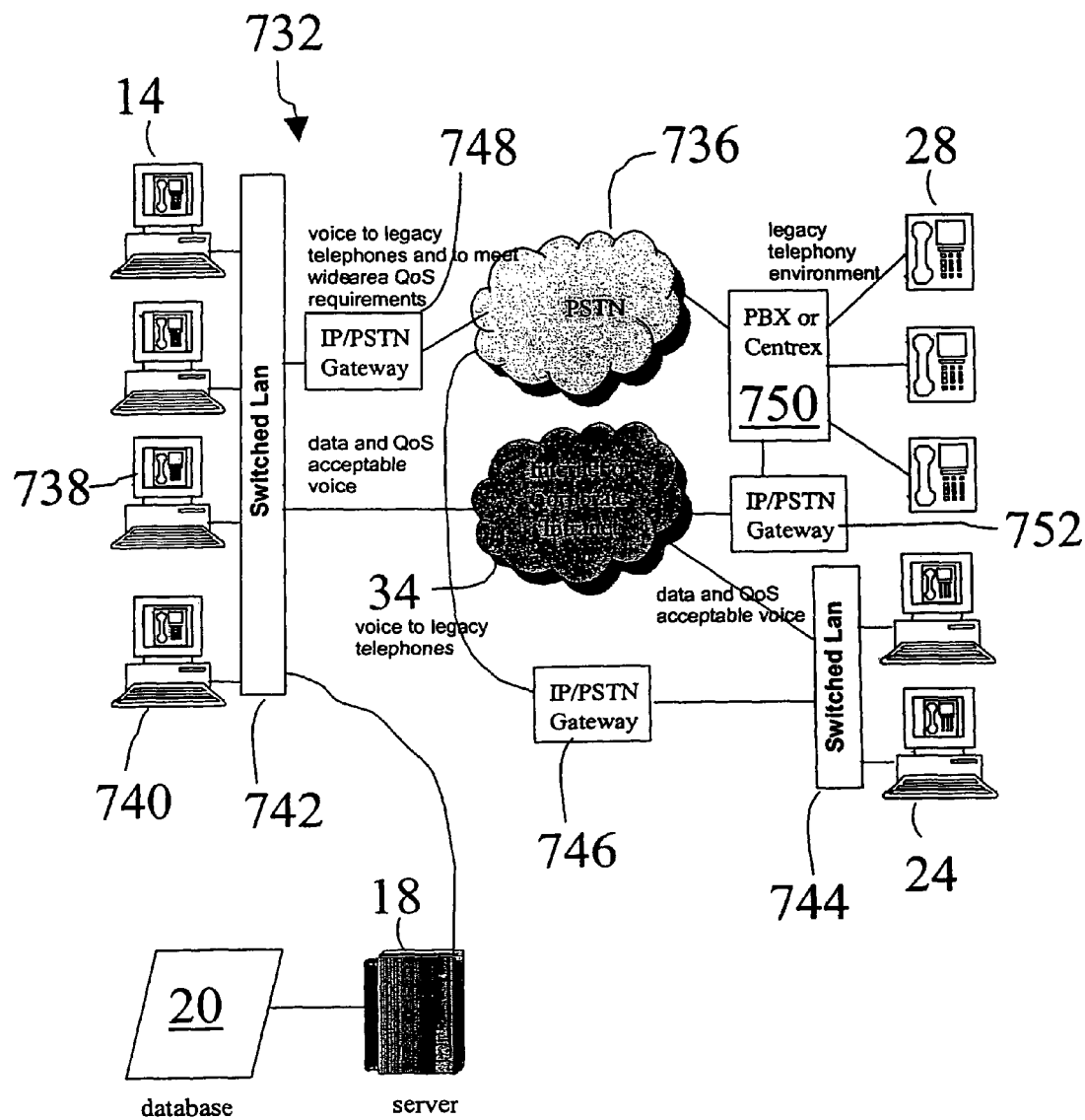
FIG. 8 is a view of another communication system.

FIG. 8 shows communication system 732. System 732 includes a network 734 which can be the Internet or a corporate intranet. System 732 also includes a Public Switched Telephone Network (PSTN) 736. PSTN 736 can include, for example, a portion of the world's collection of interconnected voice-oriented public telephone networks, both commercial and government-owned. Voice-enabled computers 14, 738, and 740 are connected to a switched Local Area Network (LAN) 742. Server 18 is also connected to LAN 742. Voice-enabled computer 24 connects to network 734 via LAN 744. LAN 744 also connects computer 24 to PSTN 736 via IP/PSTN Gateway 746. LAN 742 connects computers 14, 738, and 740 to PSTN 736 via IP/PSTN Gateway 748. Telephone 28 connects to PSTN 736 via private branch exchange (PBX) 750. PBX 750 is a telephone system within an enterprise that switches calls between enterprise users on local lines while allowing users to share a certain number of external phone lines. Telephone 28 can also be connected to network 734 via PBX 50 and IP/PSTN Gateway 752.

System 732 allows flexibility in handling voice and data communication between users 12, 22, and 26. For conversation modes of communication, system 732 separates data of the conversations into Internet Protocol (IP) packets and sends those packets via networks such as LANs and the Internet. For conversations using continuous streams of information, such as voice conversation and voice/video conversation modes of communication, PSTN 736 can be used in combination with network 734 via gateways 746, 748, and 752. For example, one communication path for voice conversation mode of communication between users on computers 14 and 24 is from computer 14 to LAN 742 to IP/PSTN Gateway 748 to PSTN 736 to IP/PSTN Gateway 744 to LAN 744 to computer 24. Another communication path for voice conversation mode between users on computer 14 and telephone 28 can be from computer 14 to LAN 742 to IP/PSTN 748 to PSTN 736 to PBX 750 to telephone 28. For modes of communication other than voice conversation and the voice component of voice/video conversation, system 732 transmits data via LANs 742 and 744 or network 734, for example, without going through PSTN 736.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
   accessing, by one or more computers of a first person, information for a graphical user interface that when rendered by the one or more computers displays an identifying characteristic associated with a second person's contact information;
   detecting, by the one or more computers, the first's person selection of a hotkey combination that specifies that the first user has selected textual information in the graphical user interface;
   identifying, based on detection of the hotkey combination, that the selected textual information is the identifying characteristic displayed in the graphical user interface;
   determining, by the one or more computers, a type of the identifying characteristic that is selected in the graphical user interface and that is identified by the selection of the hotkey combination, with the type of the identifying characteristic comprising one or more of a telephone number for the second person, a name of the second person, and an image associated with the second person;
   determining, based on the identifying characteristic that is selected in the graphical user interface and that is identified by the selection of the hotkey combination and the type of the identifying characteristic that is selected in the graphical user interface and that is identified by the selection of the hotkey combination, contact information for the second person; and
   launching a communication mode, with the communication mode using the contact information for the second person to establish a communication with the second person.

2. The method of claim 1 further comprising determining communication modes available to communicate with the second person based on the identifying characteristic of the second person.

3. The method of claim 1 further comprising determining communication modes available to communicate with the second person based on the type of characteristic.

4. The method of claim 1 further comprising enabling the first person to communicate with the second person using the launched communication mode.

5. The method of claim 4, wherein the graphical user interface comprises a first graphical user interface and wherein enabling the first person to communicate with the second person further comprises:
   generating by the one or more computers a second graphical user interface that when rendered on a display device renders visual representations for plural modes of communication with the visual representations when selected, launching a third interface that can be used by the first person to initiate the communication.

6. The method of claim 1 further comprising determining a communication mode identifier associated with the second person for at least a communication mode available to contact the second person.

7. The method of claim 1 wherein the communication mode comprise at least one of a voice conversation mode, an e-mail mode, a graphic text-based conversation mode, and an voice/video conversation mode.

8. The method of claim 1, wherein the graphical user interface comprises a first graphical user interface and wherein the method further comprises:
generating information for a second graphical user interface that when rendered on a display devices renders a visual representation of at least one of a name associated with the second person, presence information associated with the second person, and status information associated with the second person.

9. The method of claim 8 wherein the presence information comprises an indicator indicating that the second person is one or more of logged into a computer, at work but not logged into a computer, and out of the office.

10. The method of claim 8 wherein the status information comprises an indicator indicating that the second person is currently engaged in conversation with another person.

11. The method of claim 10 wherein the indicator indicates that the second person is currently engaged in conversation using one of voice conversation mode, voice/video conversation mode, and graphic text-based conversation mode.

12. The method of claim 1 further comprising enabling the first person to communicate with the second person by voice.

13. The method of claim 12 wherein communication by voice uses Voice over Internet Protocol (VoIP).

14. The method of claim 1 further comprising enabling the first person to communicate with the second person by voice and video.

15. The method of claim 1 further comprising enabling the first person to communicate with the second person by text-based conversation.

16. The method of claim 15 wherein the text-based conversation uses Instant Messaging.

17. The method of claim 1 further comprising enabling the first person to communicate with the second person via an e-mail message.

18. The method of claim 1 wherein the selected textual information comprises highlighted textual information.

19. The method of claim 1 wherein the identifying characteristic comprises a name of the second person.

20. The method of claim 1 further comprising:
determining, by the one or more computers, that the identifying characteristic includes a telephone number of the second person;
launching VoIP software that when executed displays on a display a graphical user interface through which the first person initiates a telephonic communication with the second person;
passing, by the one or more computers, the telephone number to the VoIP software; and
establishing the telephonic communication between the first person and the second person using the VoIP software.

21. The method of claim 1 further comprising performing optical character recognition on an image of the identifying characteristic.

22. The method of claim 1 wherein the identifying characteristic comprises an image of the second person.

23. A computer system comprising:
a processor; and
a computer readable hardware storage device storing a computer program product, the computer program product comprising instructions for causing the processor to:
access information for a graphical user interface that when rendered on a display device displays an identifying characteristic associated with a second person's contact information;
detect a first's person selection of a hotkey combination that specifies that the first user has selected textual information in the graphical user interface;
identify, based on detection of the hotkey combination, that the selected textual information is the identifying characteristic displayed in the graphical user interface;
determine a type of the identifying characteristic that is selected in the graphical user interface and that is identified by the selection of the hotkey combination, with the type of the identifying characteristic comprising one or more of a telephone number for the second person, a name of the second person, and an image associated with the second person;
determine, based on the identifying characteristic that is selected in the graphical user interface and that is identified by the selection of the hotkey combination and the type of the identifying characteristic that is selected in the graphical user interface and that is identified by the selection of the hotkey combination, contact information for the second person; and
launch a communication mode, with the communication mode using the contact information for the second person to establish a communication with the second person.

24. The system of claim 23 further comprising a network.

25. The system of claim 23 wherein the computer program product further comprises instructions for causing the processor to:
provide the second person with information indicative of a communication mode available to communicate with the first person.

26. The system of claim 23 wherein the graphical user interface comprises a first graphical user interface and wherein the computer program product further comprises instructions for causing the processor to:
generate information for a second graphical user interface that when rendered on a display devices renders a visual representation of at least one of a name associated with the first person, presence information associated with the first person, and status information associated with the first person.

27. The system of claim 26 wherein the presence information comprises an indicator indicating that the first person is one or more of logged into a computer, at work but not logged into a computer, and out of the office.

28. The system of claim 26 wherein the status information comprises an indicator indicating that the first person is currently engaged in conversation with another person.

29. The system of claim 28 wherein the indicator indicates that the first person is currently engaged in conversation using one of voice conversation mode, voice/video conversation mode, and graphic text-based conversation mode.

30. The system of claim 23 wherein the computer program product further comprises instructions for causing the processor to:
detect when one or more of the first user and the second user is interacting with a computing device.

31. A computer program product stored on a computer readable hardware storage device, the computer program product comprising instructions for causing a processor device to:
- access information for a graphical user interface that when rendered on a display device displays an identifying characteristic associated with a second person's contact information;
- detect a first's person selection of a hotkey combination that specifies that the first user has selected textual information in the graphical user interface;
- identify, based on detection of the hotkey combination, that the selected textual information is the identifying characteristic displayed in the graphical user interface;
- determine a type of the identifying characteristic that is selected in the graphical user interface and that is identified by the selection of the hotkey combination, with the type of the identifying characteristic comprising one or more of a telephone number for the second person, a name of the second person, and an image associated with the second person;
- determine, based on the identifying characteristic that is selected in the graphical user interface and that is identified by the selection of the hotkey combination and the type of the identifying characteristic that is selected in the graphical user interface and that is identified by the selection of the hotkey combination, contact information for the second person; and
- launch a communication mode, with the communication mode using the contact information for the second person to establish a communication with the second person.

* * * * *